US011028719B2

(12) United States Patent
Walker et al.

(10) Patent No.: US 11,028,719 B2
(45) Date of Patent: Jun. 8, 2021

(54) BRUSH SEAL REPAIR METHOD (71) Applicant: Raytheon Technologies Corporation, Farmington, CT (US)

(72) Inventors: David E. Walker, Rochester, NH (US); Steven M. Cote, Sanford, ME (US)

(73) Assignee: Raytheon Technologies Corporation, Farmington, CT (US)

( * ) Notice: Subject to any disclaimer, the term of this patent is extended or adjusted under 35 U.S.C. 154(b) by 119 days.

(21) Appl. No.: 16/183,815

(22) Filed: Nov. 8, 2018

(65) Prior Publication Data

US 2019/0078456 A1   Mar. 14, 2019

Related U.S. Application Data (62) Division of application No. 14/769,939, filed as application No. PCT/US2013/073787 on Dec. 9, 2013, now Pat. No. 10,132,183.

(60) Provisional application No. 61/774,180, filed on Mar. 7, 2013.

(51) Int. Cl.
| F01D 11/08 | (2006.01) |
| F01D 11/00 | (2006.01) |
| F16J 15/3288 | (2016.01) |
| F02C 7/28 | (2006.01) |

(52) U.S. Cl.
CPC ............ *F01D 11/08* (2013.01); *F01D 11/001* (2013.01); *F02C 7/28* (2013.01); *F16J 15/3288* (2013.01); *F05D 2230/80* (2013.01); *F05D 2240/56* (2013.01)

(58) Field of Classification Search
CPC . F01D 11/08; F01D 11/001; F02C 7/28; F16J 15/3288; F05D 2230/80; F05D 2240/56
See application file for complete search history.

(56) References Cited

U.S. PATENT DOCUMENTS

| 5,597,167 | A | * | 1/1997 | Snyder | ................... F01D 11/00 277/355 |
| 5,630,590 | A | * | 5/1997 | Bouchard | ............. F01D 11/001 277/301 |
| 5,732,466 | A | | 3/1998 | Bouchard | |
| 6,565,314 | B1 | | 5/2003 | Marler et al. | |
| 7,931,276 | B2 | | 4/2011 | Szymbor et al. | |
| 8,181,965 | B2 | * | 5/2012 | Addis | .................. F16J 15/3288 277/355 |
| 10,221,714 | B2 | * | 3/2019 | Peters | ..................... F01D 11/04 |

(Continued)

OTHER PUBLICATIONS

International Search Report and Written Opinion for International Application No. PCT/US2013/073787 dated Mar. 18, 2014.

(Continued)

*Primary Examiner* — David P Bryant
*Assistant Examiner* — Nirvana Deonauth
(74) *Attorney, Agent, or Firm* — Carlson, Gaskey & Olds, P.C.

(57) ABSTRACT

A method of working a brush seal assembly for a turbine engine is disclosed and includes the steps of removing an alignment tab from a used brush seal assembly, restoring at least one dimension of the alignment tab to a desired condition and attaching the restored alignment tab to a new brush seal assembly.

9 Claims, 7 Drawing Sheets (56) References Cited

U.S. PATENT DOCUMENTS

| | | | | |
|---|---|---|---|---|
| 2003/0201608 A1* | 10/2003 | Addis | ............... | F16J 15/3288 |
| | | | | 277/355 |
| 2004/0119237 A1* | 6/2004 | Datta | ............... | F16J 15/3288 |
| | | | | 277/355 |
| 2005/0151323 A1 | 7/2005 | Addis | | |
| 2006/0125190 A1 | 6/2006 | Addis | | |
| 2008/0217859 A1* | 9/2008 | Addis | ............... | F01D 11/001 |
| | | | | 277/303 |
| 2009/0224483 A1* | 9/2009 | Crudgington | ........ | F16J 15/3288 |
| | | | | 277/355 |
| 2013/0020770 A1 | 1/2013 | Hamilton et al. | | |
| 2015/0377049 A1* | 12/2015 | Weber | ............... | F16J 15/3288 |
| | | | | 415/173.7 |

OTHER PUBLICATIONS

International Preliminary Report on Patentability for International Application No. PCT/US2013/073787 dated Sep. 17, 2015.

\* cited by examiner

BRUSH SEAL REPAIR METHOD

CROSS REFERENCE TO RELATED APPLICATION

This application is a divisional of U.S. patent application Ser. No. 14/769,939 filed on Aug. 24, 2015, which is a National Phase Application of PCT Application No. PCT/US2013/073787 filed on Dec. 9, 2013 which claims priority to U.S. Provisional Application No. 61/774,180 filed on Mar. 7, 2013.

BACKGROUND

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section.

A brush seal is provided between rotating and static components to contain airflow. Brush seals include flexible brushes supported between annular rings. An anti-rotation feature is provided to hold the seal in a desired circumferential orientation. The seal is a component that is inspected and repaired during scheduled maintenance. Current repair methods require the disassembly of significant portions followed by replacement and reattachment of original parts to new replacement portions. This process can be difficult and time consuming.

Accordingly, it is desirable to design and develop methods of repairing a brush seal and other aircraft components that is less costly and time consuming.

SUMMARY

A method of repairing a brush seal assembly for a turbine engine, according to an exemplary embodiment of this disclosure, among other possible things includes removing an alignment tab from a used brush seal assembly, restoring at least one dimension of the alignment tab to a desired condition, and attaching the restored alignment tab to a new brush seal assembly.

In a further embodiment of the above, the step of removing the alignment tab comprises of cutting a portion of the used brush seal assembly proximate the alignment tab from the used brush seal assembly.

In a further embodiment of any of the above, the alignment tab includes an L-shaped cross section with a first part fixed to a first surface of the used brush seal assembly and a second part that extends transverse from the first part.

In a further embodiment of any of the above, the first part of the alignment tab includes an opening for receiving a portion of a weld for attaching the alignment tab.

In a further embodiment of any of the above, the alignment tab comprises a rectangular section that is attached to an annular ring of the brush seal assembly.

In a further embodiment of any of the above, the step of restoring the at least one dimension of the alignment tab includes adding material to the alignment tab.

In a further embodiment of any of the above, includes the step of machining the added material to restore the at least one dimensions to the desired condition.

In a further embodiment of any of the above, the step of attaching the alignment tab to the new brush seal assembly comprises of welding the restored alignment tab to a first surface of the new brush seal assembly in a location common with the location of the alignment tab on the used brush seal assembly.

In a further embodiment of any of the above, the new brush seal assembly includes at least one brush that is secured between an inner ring and an outer ring.

A method of maintaining a turbine engine, according to an exemplary embodiment of this disclosure, among other possible things includes inspecting a plurality of brush seals disposed within a turbine engine, removing at least one of the plurality of brush seals from the turbine engine, removing an alignment tab from the removed brush seal, restoring the alignment tab to an original condition, attaching the restored alignment tab to a new brush seal assembly, and reassembling the new brush seal assembly with the restored alignment tab to the turbine engine.

In a further embodiment of the above, the tab is fixed to a first surface of the removed brush seal assembly. Removing the alignment tab comprises of cutting a portion of the removed brush seal assembly to free the alignment tab.

In a further embodiment of any of the above, the alignment tab includes an L-shaped cross-section with a first part attached to the first surface of the removed brush seal assembly and a second part that extends transverse to the first part. The removed brush seal assembly is cut proximate the first part to free the alignment tab.

In a further embodiment of any of the above, the step of restoring the alignment tab to an original condition includes adding material to the alignment tab and machining portions of the added material and the alignment tab to restore at least one dimension of the alignment tab to an original condition.

In a further embodiment of any of the above, the step of attaching of the restored alignment tab includes welding the restored alignment tab to a first surface of the new brush seal assembly at a desired location.

In a further embodiment of any of the above, includes the step of welding within an opening defined on the alignment tab to the first surface of the new brush seal assembly.

A restored brush seal assembly for a turbine engine, according to an exemplary embodiment of this disclosure, among other possible things includes a first ring that defines a first annular surface, a second ring defining a second annular surface, at least one brush seal supported between the first ring and the second ring, and an alignment tab that is attached to one of the first ring and the second ring. The alignment tab includes at least one surface that comprises of added material that was machined to provide a desired dimension.

In a further embodiment of the above, the at least one brush seal comprises two brush seals that are supported between the first and second rings and an inner ring is supported between the first and second brush seals.

In a further embodiment of any of the above, the alignment tab includes a first part that is attached to one of the first ring and the second ring and a second part that extends transverse to the first part. The at least one surface comprises of added material that is machined to provide the desired dimension is within the first part.

In a further embodiment of any of the above, the first part includes an opening and the at least one surface comprises of added material that is machined to provide a desired dimension and includes an inner perimeter of the opening.

In a further embodiment of any of the above, a weld secures the alignment tab to one of the first ring and the second ring within the inner perimeter of the opening.

Although the different examples have the specific components shown in the illustrations, embodiments of this disclosure are not limited to those particular combinations. The foregoing features and elements may be combined in various combinations without exclusivity, unless expressly indicated otherwise. These features and elements as well as the operation thereof will become more apparent in light of the following description and the accompanying drawings.

These and other features disclosed herein can be best understood from the following specification and drawings, the following of which is a brief description.

DETAILED DESCRIPTION

Figure 1:
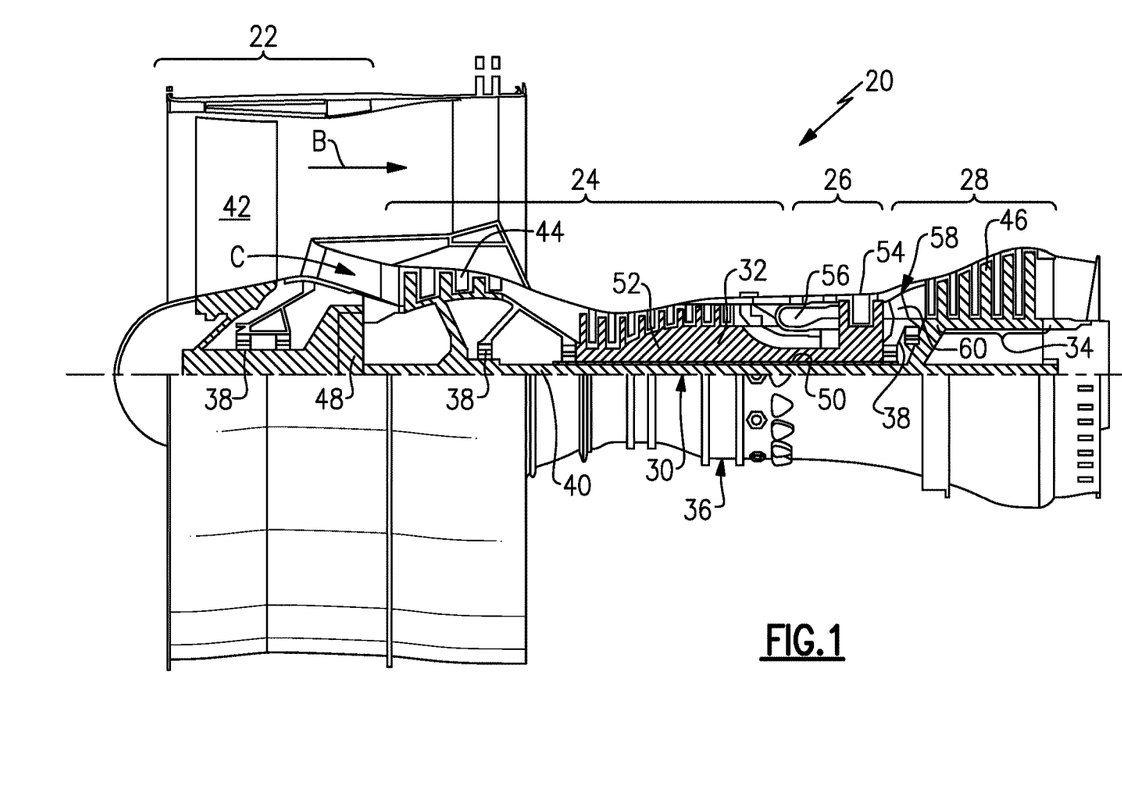
FIG. 1 is a schematic view of an example gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

Airflow through the core airflow path C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment, the low fan pressure ratio is less than about 1.45.

"Low corrected fan tip speed" is the actual fan tip speed in ft/sec divided by an industry standard temperature correction of $[(Tram° R)/(518.7° R)]^{0.5}$. The "Low corrected fan tip speed", as disclosed herein according to one non-limiting embodiment, is less than about 1150 ft/second.

The example gas turbine engine includes the fan 42 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotors schematically indicated at 34. In another non-limiting example embodiment, the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Figure 2:
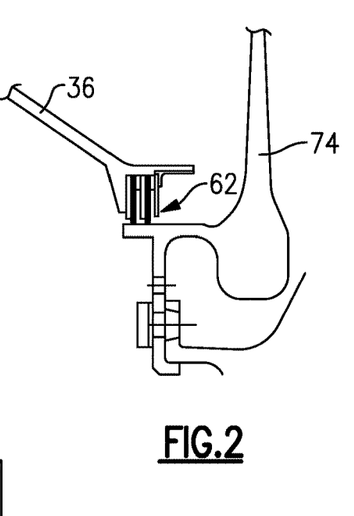
FIG. 2 is a cross-section of an example brush seal assembly within the gas turbine engine.

Referring to FIG. 2 with continued reference to FIG. 1, a brush seal 62 is provided in several locations between static and rotating components. In this example, the brush seal 62 is provided between a static engine structure 36 and a rotor 74 within the high pressure turbine 54.

The brush seal 62 is a component that is removed and repaired. The disclosed brush seal 62 includes brushes 64 that are supported between a middle detail 66 and rings 68 and 70. An alignment tab 72 provides an anti-rotation function and is secured to one of rings 68. As appreciated, although this disclosure describes an example brush seal configuration, other brush seals that include an alignment feature or tab would also benefit from the method of this disclosure.

Figure 3:
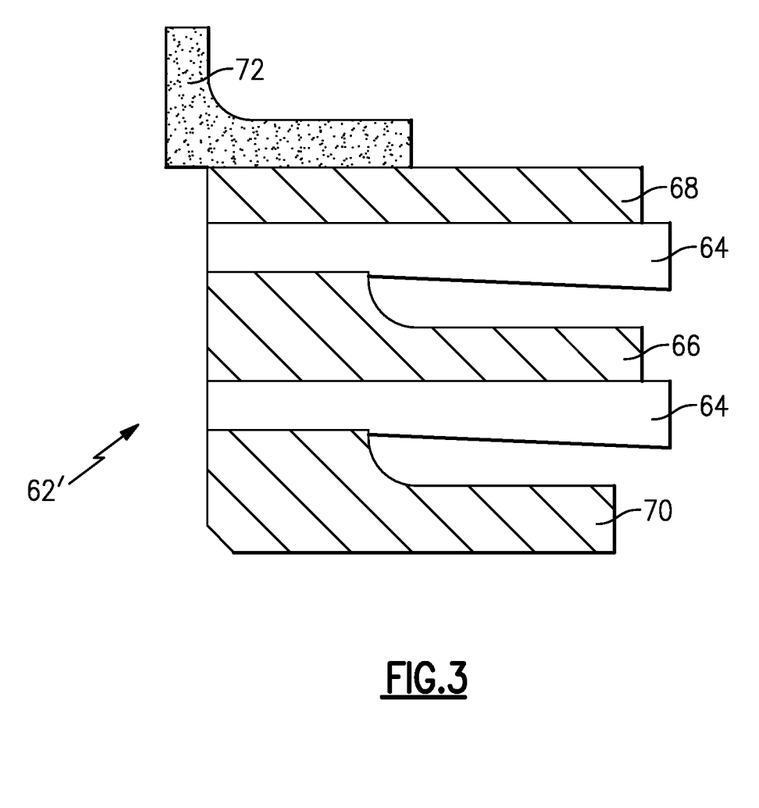
FIG. 3 is a cross-section of an example repaired brush seal assembly.

A repair is a maintenance procedure where portions of a component are replaced, with a portion of the original component remaining in the repaired part. Accordingly, a disclosed method improves the repair process and is less time intensive. A disclosed repaired brush seal assembly 62' is shown in FIG. 3 and utilizes the original alignment tab 72 and replaces all other components. The alignment tab 72 from the original part is welded to new components including new the rings 68, 70 brushes 64 and middle detail 66. The original alignment tab 72 is attached to the replaced components to provide the desired repaired brush seal assembly 62'. A disclosed example method of repairing a brush seal assembly 62' for a turbine engine 20 includes the steps of removing an alignment tab 72 from a used brush seal assembly 62, restoring at least one dimension of the alignment tab 72 to a desired condition, and attaching the restored alignment tab 72' (FIG. 6) to a new brush seal assembly.

Figure 4:
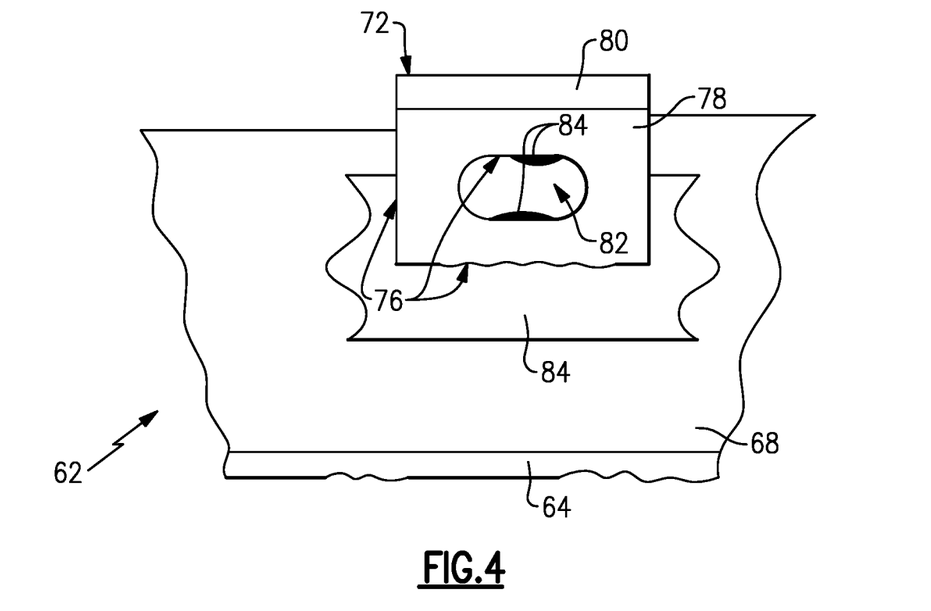
FIG. 4 is a perspective view of an alignment tab mounted to a brush seal assembly.
Figure 5:
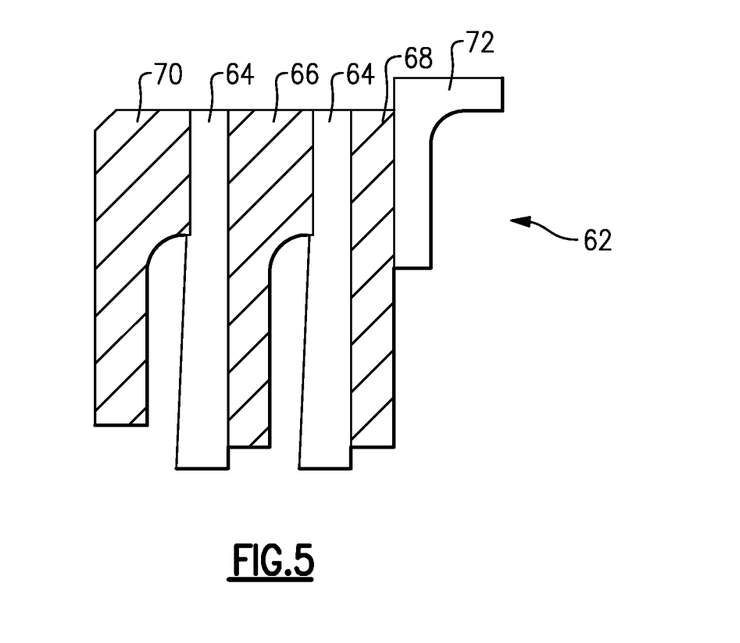
FIG. 5 is a cross-section of an example brush seal assembly.
Figure 6:
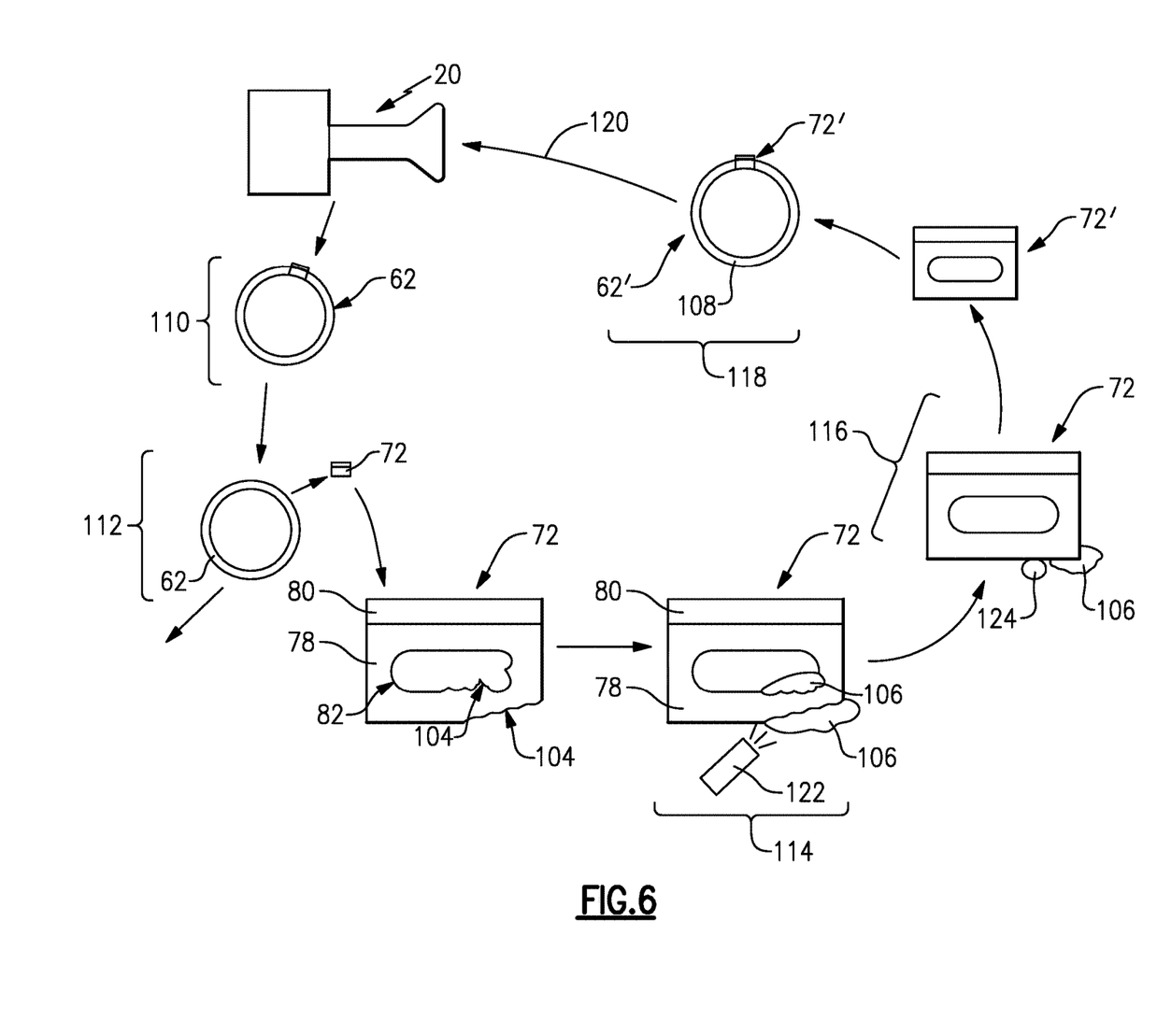
FIG. 6 is a schematic view of a method of restoring a brush seal assembly.

Referring to FIGS. 4-6, the disclosed repair method begins by inspecting a plurality of brush seals disposed within a turbine engine 20. Inspected brush seal assemblies are determined to require repair based on predetermined conditions. The predetermined conditions dictating repair can include visual inspection, condition of brushes 64, the expiration of a desired time interval, or any other characteristic or reason.

The method continues by removing at least one of the plurality of brush seals from the turbine engine 20. Removing of the original used brush seal assembly 62 from the turbine engine 20 as is schematically shown at 110 in FIG. 6. The original brush seal assembly 62 (FIGS. 4 and 5) includes the original rings 68, 70, brushes 64 and middle detail 66. Repairs are performed when the brushes 64 are worn and no longer provide a substantially uniform contact surface as is shown in FIG. 4. Moreover, a used brush seal assembly 62 may also be repaired based on predetermined engine maintenance procedures.

The alignment tab 72 is attached to the ring 68 of the original part by a weld 84 within the opening 82 and around a periphery. The alignment tab 72 includes a first part 78 including the opening 82 and a second part 80 that extends transverse to the first part 78. The method includes the step of removing the alignment tab 72 from the removed brush seal 62. The alignment tab 72 is removed from the original used brush seal assembly 62 as schematically shown at 112 in FIG. 6.

Figure 7:
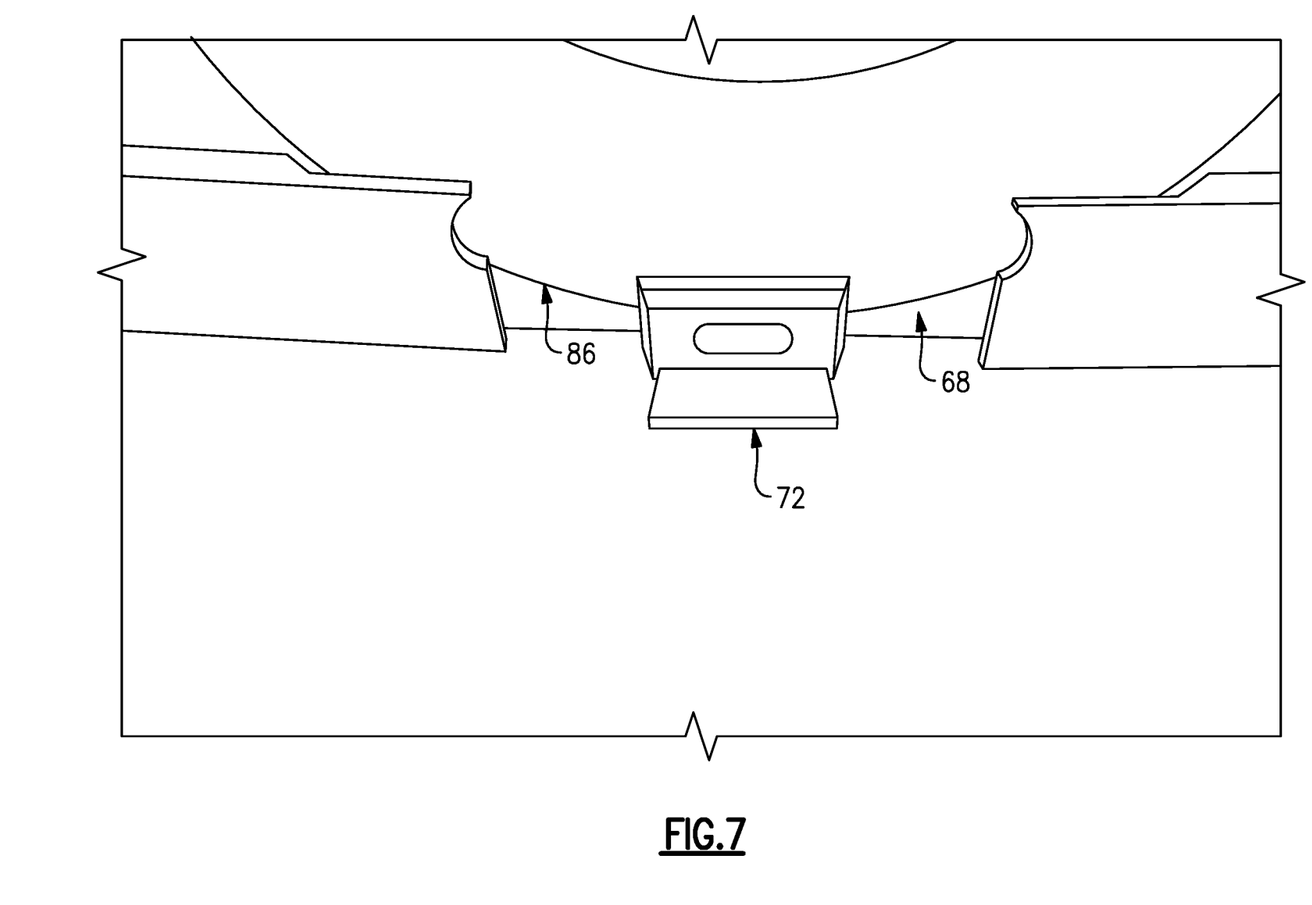
FIG. 7 is a perspective view of removal of an alignment tab from a used brush seal assembly.

Referring to FIG. 7 with continued reference to FIG. 6, removing the alignment tab 72 includes cutting through the weld 84 between the alignment tab 72 and the ring 68. In this example, an abrasive cutting wheel 86 is used to free the alignment tab 72 from the original brush seal assembly 62. The cut is biased to remove material for the ring 68 to preserve as much of the alignment tab 72 as is practical. As appreciated, other methods that remove the alignment tab 72 from the original part may also be utilized and are within the contemplation of this disclosure.

Figure 8:
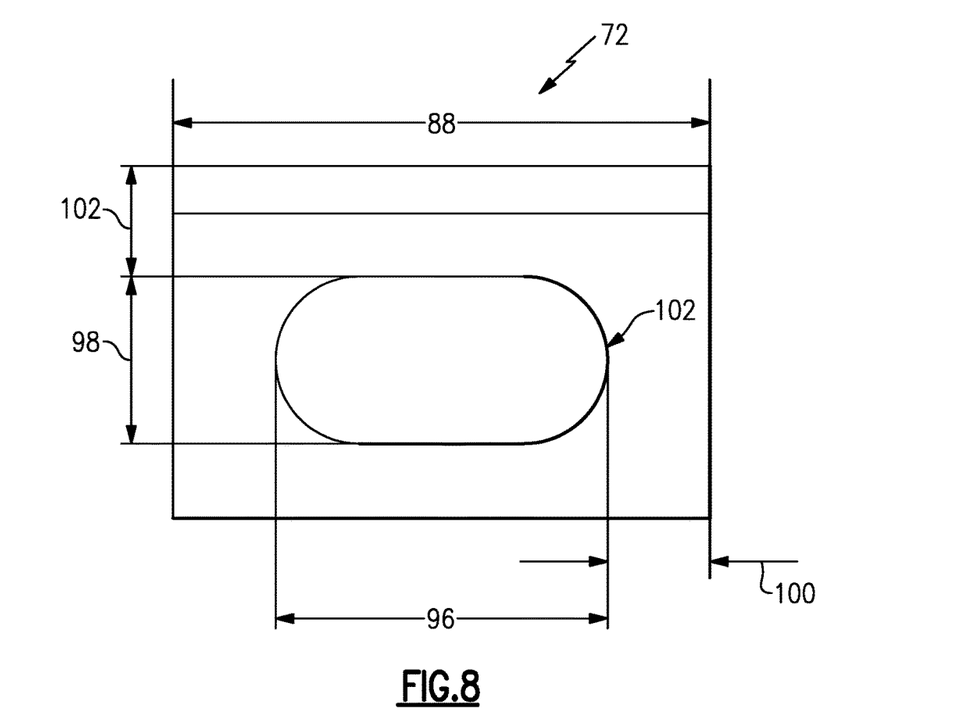
FIG. 8 is a side view of an example alignment tab.
Figure 9:
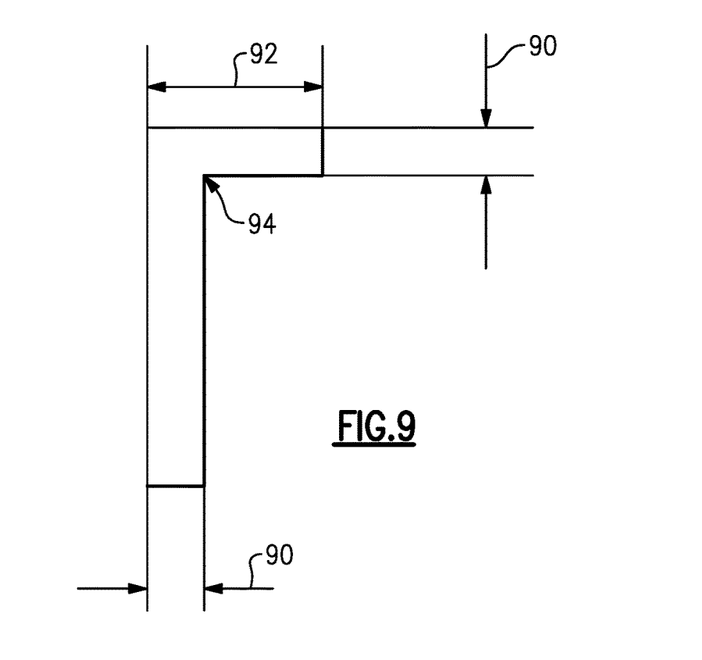
FIG. 9 is a top view of an example alignment tab.

Referring to FIGS. 8 and 9 with continued reference to FIG. 6, once the alignment tab 72 is free from the original brush seal assembly 62, it is restored to the original dimensions 88, 90, 92, 94, 96, 98, 100 and 102. Accordingly, the method continues by restoring the alignment tab to an original condition. Restoring at least one of the dimensions 88, 90, 92, 94, 96, 98, 100 and 102 includes adding material.

The addition of material to the original alignment tab 72 could be performed while the alignment tab 72 is still attached to the original brush seal assembly 62, or once removed. Moreover, some of the dimensions 88, 90, 92, 94, 96, 98, 100 and 102 may be restored prior to removal, with the remainder of the dimensions restored once free of the original brush seal assembly 62. The alignment tab 72 includes an L-shaped cross section with the first part 78 fixed to a first surface of the used brush seal assembly 62 and the second part 80 extending transverse from the first part 78. The first part 78 is a rectangular section attached to the annular ring 68 of the brush seal assembly removal of the alignment tab 72 can result in deformation on various surfaces as is schematically indicated at 104 in FIG. 7. Material is added where necessary as schematically shown at 114 in FIG. 7.

The addition of material can be performed utilizing different methods includes the use of welding tool 122 to add material 106 to the deformed areas 104. The welding process may add material of the same composition as that of the original alignment tab, or other material that is compatible with the original material and acceptable for the desired repair.

Figure 10:
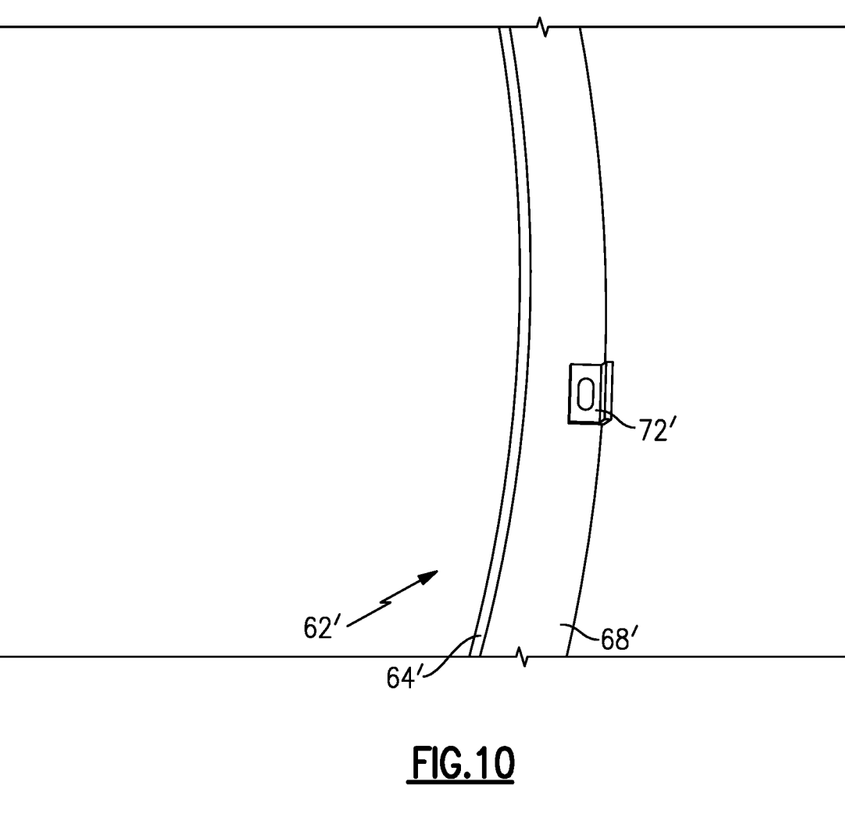
FIG. 10 is a top view of an example restored alignment tab restored brush seal assembly.

The welding process 114 is not sufficiently precise to return the alignment tab 72 to the original dimensional specifications as shown in FIGS. 9 and 10. Accordingly, excess material is provided to facilitate a subsequent machining process as is schematically shown at 116 in FIG. 6. The machining process 116 utilizes a machine tool 124 to remove excess material 106. Moreover, the machining process 116 will also remove any material remaining from the original ring 68 due to the cutting process 112. The original alignment tab 72 is therefore restored to the desired original dimensions within acceptable tolerance ranges to provide a restored alignment tab shown schematically at 72'.

Referring to FIG. 10 with continued reference to FIG. 6, the method continues with the step of attaching the restored alignment tab to a new brush seal assembly. The restored alignment tab 72' is attached to new components to complete the repair. In this example the new components include new brushes 64', middle detail 66' and rings 68', 70'. The new components are in a preassembled condition as shown at 108 and provided complete prior to attachment of the alignment tab 72' as shown schematically at 118. In this example, attaching of the restored alignment tab 72' includes welding to the ring 68' to complete the restored brush seal assembly 62'. The method includes reassembling the new brush seal assembly with the restored alignment tab to the turbine engine 20. The restored brush seal assembly 62' is reassembled within the engine 20 as is schematically shown at 120.

Accordingly, the disclosed repair method requires only retention and repair of the alignment tab 72 to complete the repair and restoration. The new component parts of the brush seal including the middle detail 66', rings 68' and 70' and the brushes 64' are provided in a completed form to simplify the restoration process. The new component parts can be assembled prior to scheduled engine maintenance such that restoration activities are directed only to the alignment tab 72 instead of complete disassembly and reassembly as is required when another detail is maintained for the restored part.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A method of repairing a brush seal assembly for a turbine engine, the method comprising:
   removing an alignment tab from a used brush seal assembly;
   restoring at least one dimension of the alignment tab to a desired condition; and
   attaching the restored alignment tab to a new brush seal assembly.

2. The method of repairing as recited in claim 1, wherein removing the alignment tab comprises cutting a portion of the used brush seal assembly including the alignment tab from the used brush seal assembly.

3. The method of repairing as recited in claim 2, wherein the alignment tab includes an L-shaped cross section with a first part fixed to a first surface of the used brush seal assembly and a second part extending transverse from the first part.

4. The method of repairing as recited in claim 3, wherein the first part of the alignment tab includes an opening for receiving a portion of a weld for attaching the alignment tab.

5. The method of repairing as recited in claim 1, wherein the alignment tab comprises a rectangular section attached to an annular ring of the brush seal assembly.

6. The method of repairing as recited in claim 2, wherein restoring the at least one dimension of the alignment tab includes adding material to the alignment tab.

7. The method of repairing as recited in claim 6, including the step of machining the added material to restore the at least one dimensions to the desired condition.

8. The method of repairing as recited in claim 1, wherein attaching the alignment tab to the new brush seal assembly comprise welding the restored alignment tab to a first surface of the new brush seal assembly in a location common with a location of the alignment tab on the used brush seal assembly.

9. The method of repairing as recited in claim 8, wherein the new brush seal assembly includes at least one brush secured between an inner ring and an outer ring.

* * * * *